Figure 8:
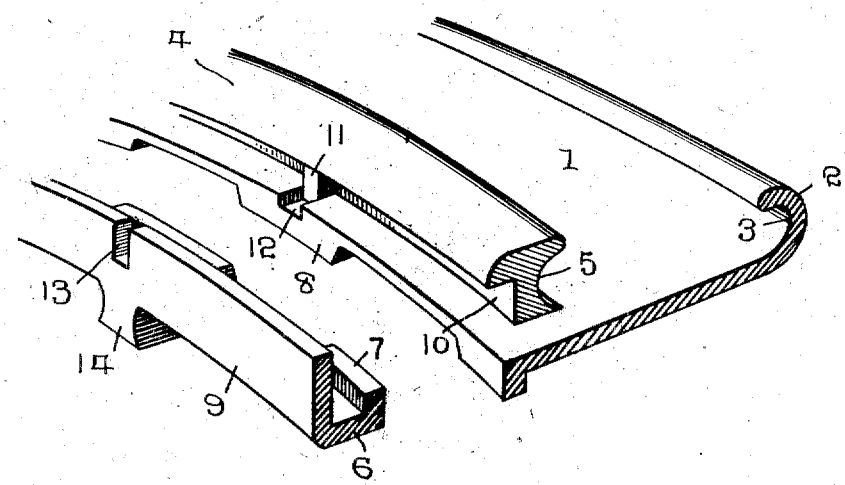

G. H. BOGENHAGEN.
RIM FOR AUTOMOBILE TIRES.
APPLICATION FILED JAN. 25, 1910.
984,186.
Patented Feb. 14, 1911.
2 SHEETS—SHEET 1.
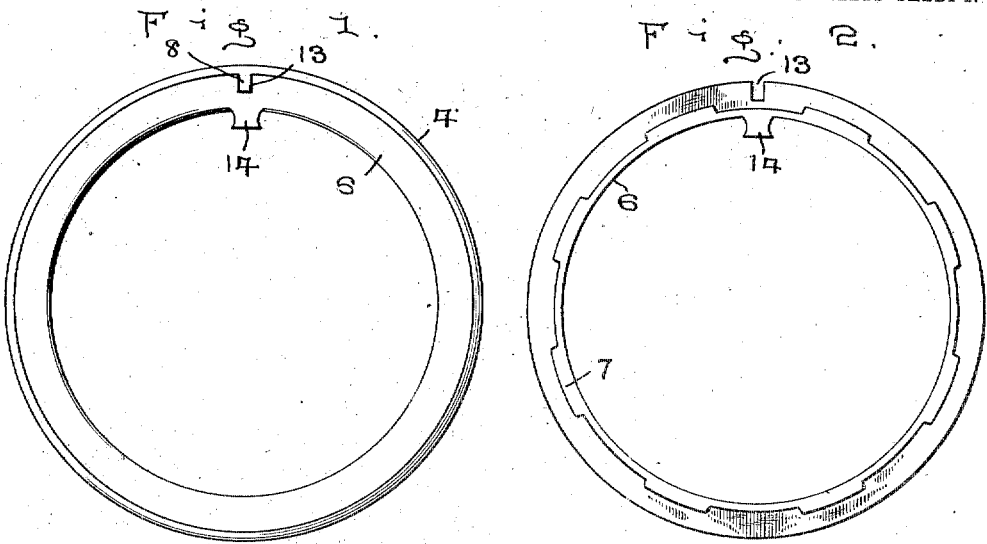
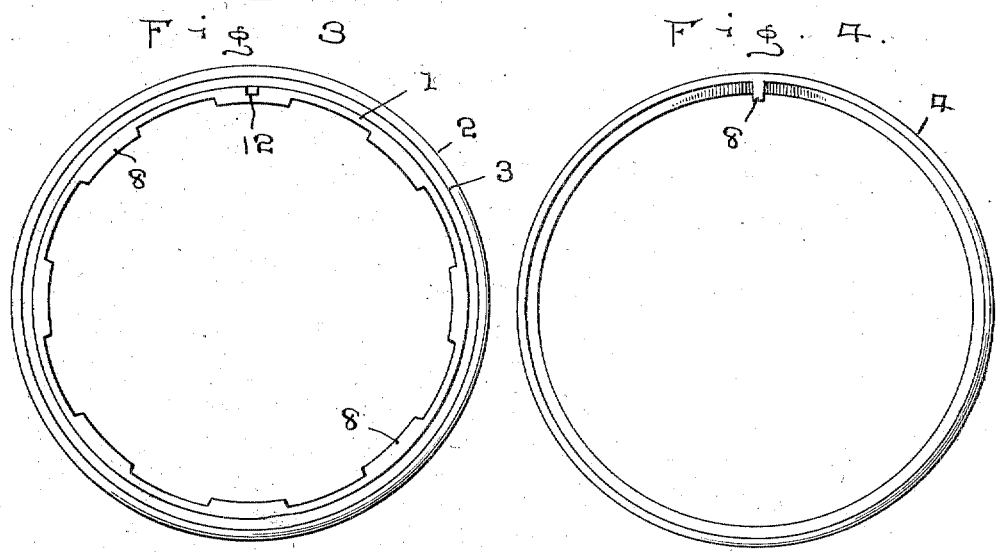
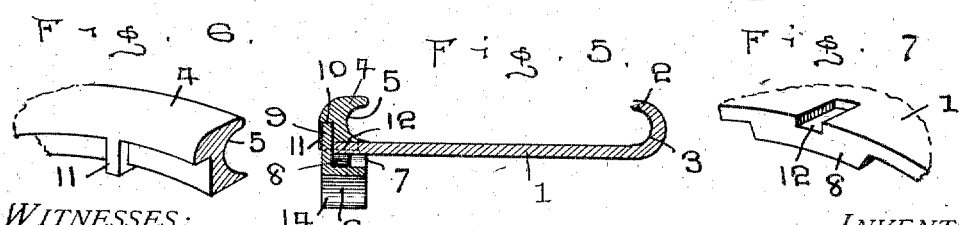
WITNESSES:
INVENTOR
G. H. Bogenhagen
BY
W. J. Fitzgerald & Co.
Attorneys

G. H. BOGENHAGEN.
RIM FOR AUTOMOBILE TIRES.
APPLICATION FILED JAN. 25, 1910.

984,186.

Patented Feb. 14, 1911.

2 SHEETS—SHEET 2.

WITNESSES:
Thos. W. Riley
W. H. Woodman

INVENTOR
G. H. Bogenhagen
BY
W. J. Fitzgerald & Co.
Attorneys

UNITED STATES PATENT OFFICE.

GUSTAVE H. BOGENHAGEN, OF BEEMER, NEBRASKA.

RIM FOR AUTOMOBILE-TIRES.

984,186.  Specification of Letters Patent.  Patented Feb. 14, 1911.

Application filed January 25, 1910. Serial No. 539,949.

*To all whom it may concern:*

Be it known that I, GUSTAVE H. BOGENHAGEN, a citizen of the United States, residing at Beemer, in the county of Cuming and State of Nebraska, have invented certain new and useful Improvements in Rims for Automobile-Tires: and I do hereby declare the following to be a full, clear, and exact description of the invention, such as will enable others skilled in the art to which it appertains to make and use the same.

My invention relates to new and useful improvements in means for attaching tires to vehicles and is adapted more particularly to be used for securing automobile tires in position on the wheels, and my object is to provide a removable ring for the wheel, whereby the tire and its casing may be quickly removed from or placed in position on the wheel.

A further object is to so construct the rim that the inflation of the tire will interlock parts of the rim.

A further object is to provide a locking ring which is adapted to hold the parts of the rim in locked position.

Other objects and advantages will be hereinafter referred to and more particularly pointed out in the specification and claims.

In the accompanying drawings which are made a part of this application, Figure 1 is a side elevation of the rim in its locked position. Fig. 2 is a similar view of the locking portion of the rim. Fig. 3 is an elevation of the rim with the locking mechanism removed. Fig. 4 is an elevation of the movable portion of the rim. Fig. 5 is a transverse sectional view on an enlarged scale through the rim. Fig. 6 is a detail sectional view of a portion of the movable section of the rim, and, Fig. 7 is a similar view of the stationary portion of the rim. Fig. 8 is a segmental perspective view of the locking ring about to be applied to the body of the rim.

Referring to the drawings in which similar reference numerals designate corresponding parts throughout the several views, 1 indicates the body portion of the rim proper, which portion is in the form of a band and is preferably fixed to the felly of the wheel, said body portion having an upwardly curved flange 2 at one edge, the inner face of which is provided with a groove 3, which groove is preferably substantially U shaped and adapted to receive the usual form of bead of the tire (not shown).

Adapted to fit around the outer face of the body 1 and move thereover is a ring 4, the inner face of which is also provided with a substantially U shaped groove 5, which is adapted to receive the bead at the opposite side of the tire and it will be readily seen that when the beads are properly seated within the grooves and the parts of the rim locked together, the tire will be securely fastened in position around the rim. The ring 4 is held in position on the body 1 by means of a locking ring 6, which ring is of less diameter than the diameter of the body and is provided on its outer surface with a plurality of lugs 7, which lugs are adapted to interlock with similar lugs 8 extending inwardly from the inner face of the body 1, said lugs being so spaced apart that when the locking ring is turned to a certain position, the lugs 7 thereon will pass between the lugs 8 and thus permit the locking ring to be engaged with or removed from the body, and said lugs are also arranged so that when the locking ring is turned to a certain position the lugs 7 will pass to the inside of the lugs 8 and interlock therewith, thus securely holding the locking ring in position.

At the outer edge of the locking ring 6 is an upstanding peripheral flange 9, which flange is of sufficient height to extend a distance above the body 1 and when the locking ring is properly positioned within the body portion, the flange 9 enters a channel 10 formed in the outer face of the ring 4, said ring 4 when properly positioned on the body, overlapping and protecting the flange 9 from wear, etc.

In order to prevent the locking ring from rotating when the wheel is in use, the ring 4 is provided with a tongue 11, which tongue extends the full width of the channel 10 and a distance below the inner face of the ring 4, the downwardly projecting portion of the tongue entering a seat 12 in the outer face of the body 1, while the body portion of the tongue extends through a notch 13 in the flange 9 and it will be readily seen that when the tongue is seated in the notch 13 and seat 12, the locking ring 6 will be firmly held against rotation independent of the body 1.

Extending inwardly from the locking ring 6 is a rib 14 upon which blows are adapted to be delivered to rotate the locking ring within the body, thus providing a convenient means for operating the locking ring to engage or disengage the same from the body portion.

In placing a tire upon the rim, the rings 4 and 6 are removed and the tire introduced over the body 1 and one of the beads of the tire engaged with the groove 3, the inner tube of the tire being deflated. The ring 4 is then introduced over the body portion and moved inwardly until the outer edge thereof is flush with the face of the body, when the locking ring 6 is entered within the body 1 and said locking ring rotated until the lugs thereon are interlocked with the lugs on the body. This operation, when the locking ring 6 is properly positioned, will bring the notch 13 in registration with the seat 12, when by inflating the tire the ring 4 will be moved outwardly until it engages the flange 9 and the tongue 11 seated in the notch 13, thus interlocking the three parts of the rim and retaining the same in this position so long as the tire is inflated. Should it be desired to remove the tire, the air is removed therefrom, when the ring 4 is moved inwardly until the tongue 11 is free of the notch 13. The locking ring 6 is then rotated until the lugs 7 are in registration with the spaces between the lugs 8 when the locking ring may be disengaged from the rim proper so that the ring 4 may be moved outwardly and the tire left free to be moved from off the rim. After a tire has been attached to the rim for some length of time, it has a tendency to adhere thereto, thus causing a considerable delay in removing the same, but by using my improved rim, this objectionable feature is overcome, as the tire can be readily separated from the movable ring and parts of the rim when said ring is disengaged from the rim. It will further be seen that when a new tire is to be placed upon the rim, the operation can be quickly accomplished by first removing the rings and slipping the tire on the rim, after which the ring 4 is placed in position around the body of the rim and the locking ring placed in position. The tire is then inflated, which will move the tongue of the ring on the rim into engagement with the notch in the locking ring thus securely interlocking the parts of the rim.

The several parts of my improved rim are preferably constructed of metal, thereby rendering the same strong and durable and practically indestructible from use and by providing the inter-locking features as shown, the usual requirement for cotter pins, screws, wedges and the like is dispensed with and in view of the great simplicity of the parts of the rim they can be produced at a minimum cost.

What I claim is:

1. A vehicle wheel rim, comprising a body portion having a flange at one edge thereof, a movable ring adapted to be introduced over the opposite edge of the body, said movable ring having a tongue, a locking ring, means to interlock the same with said body, said locking ring having a flange adapted to prevent outward motion of the first mentioned ring, said flange having a notch therein adapted to receive the tongue of the first mentioned ring, whereby the parts of the rim may be locked together.

2. A rim for vehicle wheels, comprising a body portion having a flange at one edge thereof, said flange having a groove, the opposite edge of said body portion having a seat therein and a plurality of inwardly extending lugs, a ring adapted to surround said body, said ring having a groove in one face and a channel in the opposite face, a tongue intersecting said channel and extending below the inner edge of the ring, said inwardly extending portion engaging said seat, and a locking ring having a plurality of lugs thereon adapted to interlock with the lugs on the body, said locking ring also having a flange adapted to enter the groove in the first mentioned ring, said flange having a notch to receive the tongue of the first mentioned ring.

In testimony whereof I have signed my name to this specification in the presence of two subscribing witnesses.

GUSTAVE H. BOGENHAGEN.

Witnesses:
EMIL E. WOLF,
C. H. BRINKMANN.